April 28, 1936.  R. H. GODDARD  2,039,217
NOZZLE FOR USE IN WELDING THIN METAL STRUCTURES
Filed April 6, 1934
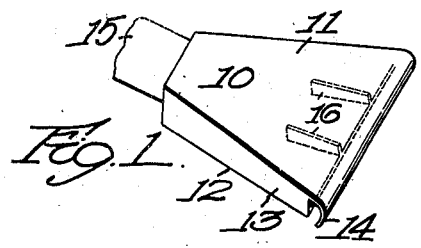
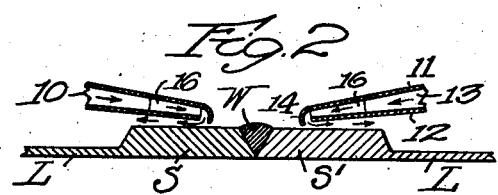
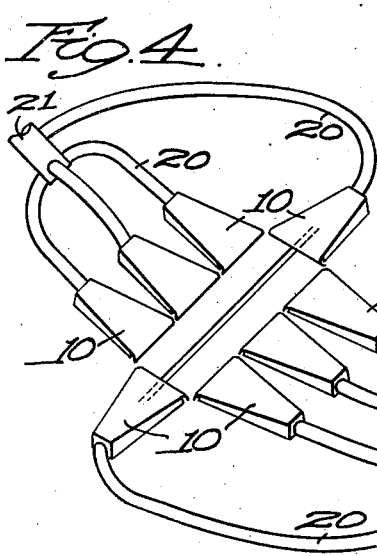
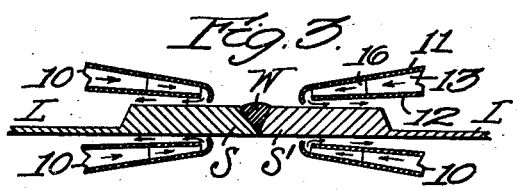
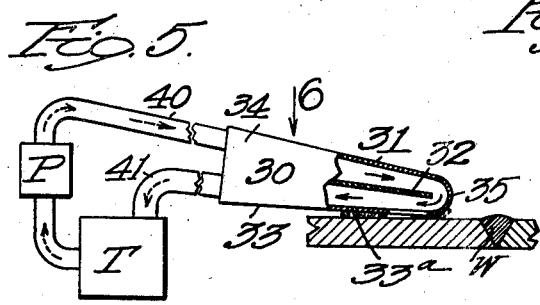
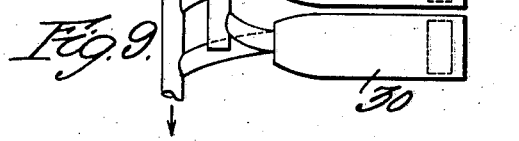
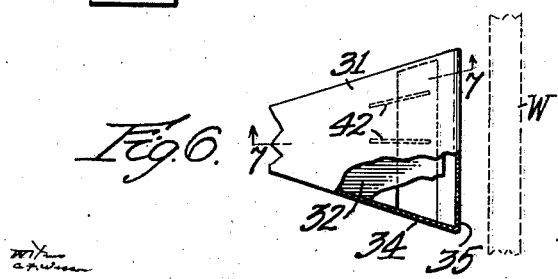
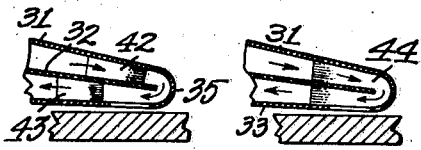
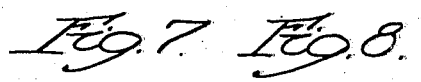
Inventor
Robert H. Goddard Patented Apr. 28, 1936

2,039,217

UNITED STATES PATENT OFFICE 2,039,217

NOZZLE FOR USE IN WELDING THIN METAL STRUCTURES

Robert H. Goddard, Worcester, Mass.

Application April 6, 1934, Serial No. 719,356

2 Claims. (Cl. 113—98)

This invention relates to the fabrication of metal structures from sheets or other sections of relatively thin metal by welding, brazing or soldering together the edges of such sheets or sections; and is a continuation in part of my prior application Serial No. 677,020 filed by me June 22, 1933.

While capable of more general application, this invention relates particularly to the provision of new and improved nozzles for use in the production of fabricated structures from relatively thin heat-treated metals, more commonly in the form of sheets or plates. Light weight tanks and cylinders are types of such structures.

It is well known in the art of metal working that the strength of many metals is greatly increased by submitting such metals to proper heat-treatment. In the case of thin sheets of certain metals, such as alloy steel, the strength of the heat-treated sheets or plates may be three or four times that of an untreated or annealed sheet of the same metal.

The great advantage of using such heat-treated and very strong sheets for the production of very thin and light-weight structures, such as fuel tanks for air-craft, is obvious, but it has heretofore been considered practically impossible to utilize the full value of such heat-treated sheets in welded or brazed structures. This was because the heat from the welding or brazing operation softened or annealed portions of the thin sheets adjacent the joint, destroying the effects of the heat-treatment thereof and leaving these portions with the much lower strength of the untreated metal.

It is the general object of my invention to provide a new and improved nozzle for use in such operations by which a cooling liquid may be directed against the metal closely adjacent the line of the joint, so that transfer of heat to more remote portions of the thin metal is effectively prevented.

A further feature of the invention relates to the provision of means by which the cooling liquid after engaging the work may be withdrawn by suction and may, if desired, be used again.

In the following description and claims, the word "welding" is to be interpreted as including also the processes of brazing or soldering.

Preferred forms of the invention are shown in the drawing, in which

Fig. 1 is a perspective view of one form of my improved nozzle;

Fig. 2 is a sectional side elevation showing two of the nozzles in use;

Fig. 3 is a view similar to Fig. 2 but showing the use of additional nozzles;

Fig. 4 is a perspective view illustrating the application of my invention to extended or irregular work;

Fig. 5 is a perspective view of a modified construction of nozzle;

Fig. 6 is a plan view of the nozzle shown in Fig. 5;

Fig. 7 is a detail sectional elevation, taken along the line 7—7 in Fig. 6;

Fig. 8 is a view similar to Fig. 7 but showing a further slight modification;

Fig. 9 is a plan view indicating the use of a plurality of the nozzles shown in Fig. 5, and Fig. 10 is a sectional view showing a modified type of joint.

Referring particularly to Figs. 1 and 2, I have shown a nozzle 10 having a top plate 11, a bottom plate 12, sides 13 and a curved end portion 14. A supply pipe 15 is connected to the nozzle at the end opposite the portion 14.

The nozzles may be made of any desired width and may be fan-shaped as indicated in Fig. 1. When of extended width, partitions 16 may be provided to hold the plates 11 and 12 in definite and permanent spaced relation. The end portion 14 projects downward below the plate 12, as clearly shown in Fig. 2, and is preferably slightly curved rearward or away from the line of weld, indicated at W between the pieces of stock S and S' to be secured.

In the use of my improved nozzle, one or more nozzles are positioned at each side of the line of weld, and water or other cooling fluid is forced through the nozzles during the welding operation. The direction of flow is indicated by the arrows in Fig. 2, from which figure it is evident that the water is applied closely adjacent the line of weld but in such manner that the flow of water thus applied is away from the weld, thus effectively preventing the spread of heat without unduly cooling the stock directly at the line of weld itself.

The pieces of stock S and S' may constitute the edges of plates to be welded together, or they may be thickened edge portions secured to yet thinner plates, as indicated at L in Fig. 2. The stock may also be gradually thickened at the edges, as in Fig. 10, and the extreme edges may be bent upward and abutted, as also shown in said figure.

Where even more effective cooling is desired, the arrangement shown in Fig. 3 may be used, in which the cooling liquid is applied at both sides of the line of weld and also at both sides of the stock, the four nozzles being all located closely adjacent the line of weld.

If the length of the weld is considerable or the surface is irregular, a plurality of nozzles may be provided as indicated in Fig. 4, said nozzles being connected by branch pipes 20 to main supply pipes 21. Obviously the nozzles 10 may be made of any desired width or shape and may be assembled in any desired number and in any desired relative positions.

In Figs. 5 to 8 I have shown a modified construction of nozzle in which provision is made for removing the cooling liquid by suction after the cooling action thereof on the metal. For this purpose I provide the duplex type of nozzle 30 shown in Figs. 5 to 8, each nozzle 30 comprising a top or cover plate 31, an intermediate plate 32, a bottom plate 33, side plates 34 and a downwardly directed end portion 35.

In this construction, the side plates 34 extend the full length of the nozzle to the end portion 35 and closely engage the surface of the metal to be welded, so as to prevent the escape of water or the intake of air at the edges of the nozzle.

Suitable packing material 33ª such as asbestos or some other heat-resisting cushion material may be provided along the surfaces of the nozzle which engage the work.

A supply pipe 40 delivers water or other cooling liquid between the top plate 31 and the intermediate plate 32, and a discharge or suction pipe 41 removes the water through the passage between the intermediate plate 32 and the bottom plate 33.

The pipes 40 and 41 may be connected to the intake and discharge of a pump P, so that a continuous circulation of water may be secured, and a cooling tank T may be provided or other suitable provision may be made for cooling the water before its return.

With this construction, a more rapid and positive circulation of water may be attained than with the construction shown in Figs. 1 to 4 in which no suction for the return flow is provided.

Spacing members or partitions 42 and 43 (Fig. 7) may be provided to hold the plates 31, 32 and 33 in desired spaced relation, or one-piece slotted spacing members 44 (Fig. 8) may be provided which also engage and support the end portion 35 of the duplex nozzle.

A plurality of duplex nozzles may be grouped together for extensive or irregular welds, as indicated in Fig. 9, these nozzles being connected by suitable branch connections as previously described in connection with Fig. 4.

By the use of my improved nozzles, a cooling fluid may be applied very close to the line of weld but without interference with the welding arc or gas flame by which the weld is produced.

While the single nozzle is effective and satisfactory in ordinary welding operations, the duplex nozzle permits a more rapid circulation of water and consequently gives an increased cooling effect.

While I have indicated the weld in Figs. 2 and 10 as taking place between the thickened edges of thin sheet material, it will be understood that the work is shown herein for illustration only, and that the nozzles are adapted to operate in connection with the forming of any kind of a welded, brazed or soldered joint between any two portions of sheet metal.

Having thus described my invention and the advantages thereof, I do not wish to be limited to the details herein disclosed, otherwise than as set forth in the claims, but what I claim is:—

1. A nozzle for conducting a cooling fluid to the surface of a piece of metal adjacent a welding point which comprises a laterally expanded casing having flat and substantially parallel top and bottom members and connecting side members, said top member being extended endwise beyond said bottom member and having a return end portion, the edge of which end portion is substantially in the plane of said bottom member but spaced outwardly therefrom to provide an opening for delivery of cooling liquid against the surface to be cooled.

2. A nozzle for conducting a cooling fluid to the surface of a piece of metal adjacent a welding point which comprises a laterally expanded casing having flat and substantially parallel top and bottom members and connecting side members, and a mid partition in said casing spaced from said top and bottom members, said top member being extended endwise beyond said bottom member and mid partition and having a segmental return end portion with its lower edge substantially in the plane of said bottom member but spaced outwardly therefrom to provide an opening for delivery of cooling liquid against the surface to be cooled and the direction of flow of said cooling liquid being reversed around the end of said partition member by said end portion and being thereby caused to engage the surface to be cooled in a reverse and substantially tangential direction.

ROBERT H. GODDARD.